May 26, 1925. 1,539,050
H. A. McCHESNEY
PISTON RING
Filed June 14, 1924
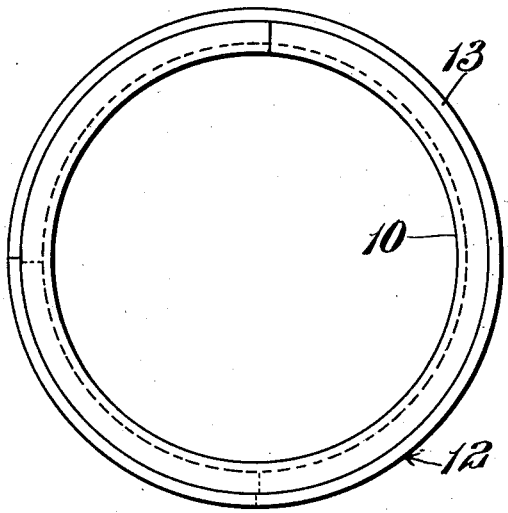
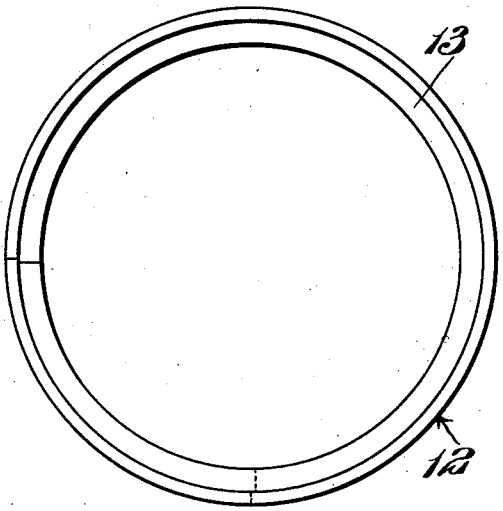
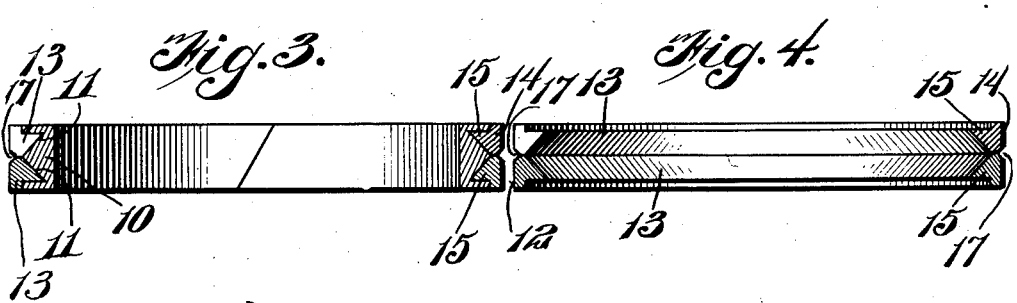
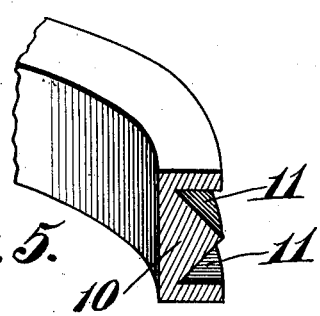
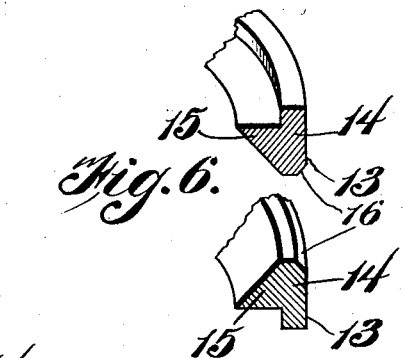
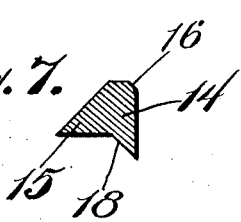
Inventor
Harold A. McChesney
Watson E. Coleman
Atty Patented May 26, 1925.

1,539,050

UNITED STATES PATENT OFFICE.

HAROLD A. McCHESNEY, OF ST. JAMES, MINNESOTA.

PISTON RING.

Application filed June 14, 1924. Serial No. 719,997.

*To all whom it may concern:*

Be it known that I, HAROLD ALLEN MC-CHESNEY, a citizen of the United States, residing at St. James, in the county of Watonwan and State of Minnesota, have invented certain new and useful Improvements in Piston Rings, of which the following is a specification, reference being had to the accompanying drawings.

This invention relates to piston rings and more particularly to a multiple section piston ring.

An important object of the invention is to provide a device of this character including a spring steel expanding ring and the usual outer or sealing rings forced into engagement with the walls of the piston by the expanding ring, the sealing rings being removable and replaceable when they become ineffective as the result of use.

A further object of the invention is to provide a construction of this character in which the inner ring or expanding ring is located within the groove of the piston and so protected from the intense heat to which projecting portions of the ring are subjected.

A still further object of the invention is to provide a device of this character which may be cheaply produced, when compared with rings of this class, which will be durable and efficient in service and a general improvement in the art.

These and other objects I attain by the construction shown in the accompanying drawings, wherein for the purpose of illustration is shown a preferred embodiment of my invention and wherein:—

Figure 1 is a plan view of a complete ring constructed in accordance with my invention;

Figure 2 is a plan view of the outer ring member;

Figure 3 is a sectional view through the complete ring.

Figure 4 is a sectional view taken through the outer ring member removed;

Figure 5 is a fragmentary perspective of the inner ring member;

Figure 6 is a fragmentary combined perspective of the sections of the outer ring member.

Figure 7 is a sectional view taken through the lower two outer ring sections which have been prepared to provide an oil ring.

Referring now more particularly to the drawings, the numeral 10 indicates an inner or expanding ring having its outer surface provided with a pair of V-shaped grooves 11. These grooves 11 each have their outer wall parallel to the outer wall of the expanding ring proper and the inner walls inclining to meet the inner wall of the other of the grooves, thus giving to the outer surface of the sealing ring when viewed in cross section an M-shaped contour.

Associated with the inner expanding ring 10 is an outer ring 12 formed in two identical sections 13, each having a body portion 14 the outer face of which is adapted to contact the wall of the cylinder and which is equal to one-half the width of the inner ring 10. Projecting inwardly from the inner face of this body portion, at a point spaced from the outer marginal edge thereof a distance equal to the distance between the outer wall of the groove 11 from the outer wall of the expanding ring 10, is a flange 15 fitting within and conforming to the shape of this groove. The ring 10 and each of the sections 13 of the outer ring 12 will be split, as indicated, and in placing the outer ring sections 13 upon the inner ring care is preferably taken that the splits of the rings are staggered with relation to one another, thus providing a complete seal for the ring against the passage of the products of combustion in operation of the engine. In the construction of the outer ring sections 13, adjacent outer corners of the body portion 14 thereof are preferably removed to form a slight bevel, as indicated at 16, these bevels combining when the ring sections are in position on the inner ring to form a V-shaped groove 17 for the reception of lubricant.

At any time that the outer ring sections 13 or the outer faces of the bodies 14 thereof are grooved or otherwise destroyed so that they no longer provide a seal, these may be replaced without the necessity of replacing the inner ring 10. These outer ring sections 13 may be formed of any suitable material, as cast iron or bronze, and in the latter instance a bronzed face ring is provided at much less cost than a complete bronzed ring could be produced. It will be obvious that by beveling the inner edge corner of the lower end of the body 14 of the lower ring section 13, as suggested at 18 in Figure 7, an oil ring may be produced with but slight additional cost. It will, of course, be obvious that the outer ring section will be made sufficiently light to permit the outer ring sections to conform to the shaping of the piston wall which is worn slightly out of round.

Certain modifications being possible without in any manner departing from the spirit of my invention, I do not limit myself to the specific construction hereinbefore set forth except as hereinafter claimed.

I claim:—

1. A piston ring comprising inner and outer ring members, the inner member acting as an expansion ring to expand the outer member, the inner member being formed in its outer face with a pair of V-shaped grooves, each having its outer wall parallel to the outer wall of the inner ring and its inner wall inclining to meet the inner wall of the other of the grooves, the outer ring member having a piston wall engaging body portion of the same thickness as the inner ring and having its inner edges abutting and conforming to the outer surface of the inner ring member.

2. A piston ring comprising inner and outer ring members, the inner member acting as an expansion ring to expand the outer member, the inner member being formed in its outer face with a pair of V-shaped grooves, each having its outer wall parallel to the outer wall of the inner ring and its inner wall inclining to meet the inner wall of the other of the grooves, the outer ring member having a piston wall engaging body portion of the same thickness as the inner ring and having its inner edges abutting and conforming to the outer surface of the inner ring member, said outer ring member being formed in two sections, each bearing one-half of the piston wall engaging body and each having a flange extending into and conforming to the shaping of the groove.

3. A piston ring comprising inner and outer ring members, the inner member acting as an expansion ring to expand the outer member, the inner member being formed in its outer face with a pair of V-shaped grooves, each having its outer wall parallel to the outer wall of the inner ring and its inner wall inclining to meet the inner wall of the other of the grooves, the outer ring member having a piston wall engaging body portion of the same thickness as the inner ring and having its inner edges abutting and conforming to the outer surface of the inner ring member, said outer ring member being formed in two sections, each bearing one-half of the piston wall engaging body and each having a flange extending into and conforming to the shaping of the groove, said flanges being spaced from the edges of the piston wall engaging section a distance equal to the distance between the outer walls of the grooves and the outer walls of the inner ring member, the projecting portion of the wall of the lower section of the outer ring member being upwardly and inwardly beveled.

4. A piston ring comprising inner and outer ring members, the inner member acting as an expansion ring to expand the outer member, the inner member being formed in its outer face with a pair of V-shaped grooves, each having its outer wall parallel to the outer wall of the inner ring and its inner wall inclining to meet the inner wall of the other of the grooves, the outer ring member having a piston wall engaging body portion of the same thickness as the inner ring and having its inner edges abutting and conforming to the outer surface of the inner ring member, the outer ring being provided in its outer piston wall engaging face with a centrally disposed groove.

5. A piston ring comprising inner and outer ring members, the inner member acting as an expansion ring to expand the outer member, the inner member being formed in its outer face with a pair of V-shaped grooves, each having its outer wall parallel to the outer wall of the inner ring and its inner wall inclining to meet the inner wall of the other of the grooves, the outer ring member having a piston wall engaging body portion of the same thickness as the inner ring and having its inner edges abutting and conforming to the outer surface of the inner ring member, said outer ring member being formed in two sections, each bearing one-half of the piston wall engaging body and each having a flange extending into and conforming to the shaping of the groove, the adjacent outer corners of the piston wall engaging body of each of said sections being removed whereby the sections combine to provide in the outer face of the outer ring a groove.

In testimony whereof I hereunto affix my signature.

HAROLD A. McCHESNEY.